Sept. 9, 1930.   A. J. HERRMANN   1,775,459
PIPE PACKING
Filed Jan. 15, 1926
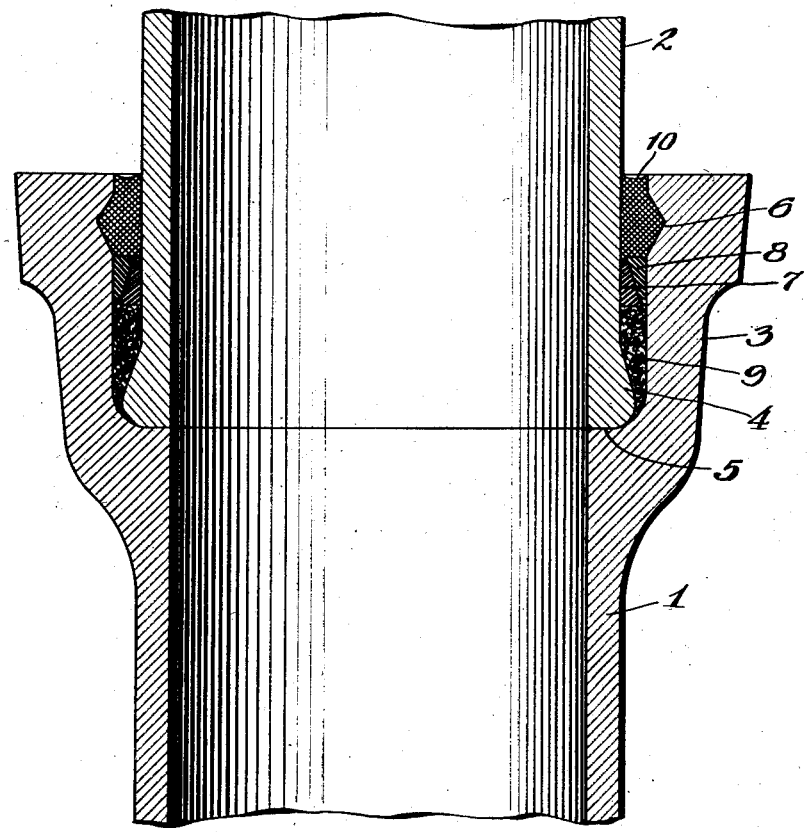
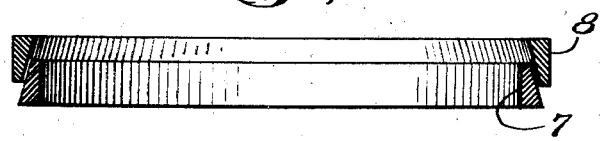
INVENTOR
ARNOLD J. HERRMANN
BY
ATTORNEY Patented Sept. 9, 1930

1,775,459

UNITED STATES PATENT OFFICE

ARNOLD J. HERRMANN, OF BIRMINGHAM, ALABAMA, ASSIGNOR TO AMERICAN CAST IRON PIPE COMPANY, OF BIRMINGHAM, ALABAMA, A CORPORATION OF GEORGIA

PIPE PACKING

Application filed January 15, 1926. Serial No. 81,398.

This invention is an improvement in pipe packings, and more particularly in packings for use between the bell and spigot of cast iron pipe lengths or sections of the bell and spigot type.

The principal difficulty experienced in the packing of pipes of the bell and spigot type is due to the large variation in the size of the space in which the joint is to be made. The actual width of the joint space in any given size of pipe, may vary between the extremes of 1/4 to 5/8 inch.

Practice has demonstrated that the usual packings will not resist gas pressures, which are found as high as 75 to 100 lbs. Even lead cast in such joints and perfectly calked does not provide a permanent gas tight joint. This is due to the fact that contraction and expansion in the pipe line loosens the lead, and a leak results.

In order to properly seal the joint, and to retain it sealed, the packing should be resilient, under radial compression when in place, so that it will be pressed closely against both bell and spigot, and will perfectly conform to the cross sectional area of the annular space between the bell and spigot at all times, regardless of slight variations in the general shape of such space.

It is extremely difficult with the ordinary forms of packings used to obtain a sufficient degree of radial compression to insure the required close contact with bell and spigot walls, since the desired radial compression must be obtained by axial compression of the packing, and it is difficult to attain and maintain the necessary axial compression.

One of the principal objects of the present invention is the provision of a packing of a nature such that any desired amount of radial compression may be attained and maintained without axial compression of the packing.

Another object is the provision of a packing by means of which a tight joint may be made between the pipe sections of a given size of pipe, regardless of variations in the actual width of the joint space.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof—

Fig. 1 is a longitudinal section of a pipe joint in accordance with the invention.

Fig. 2 is an enlarged detail in section of the packing rings.

The present embodiment of the invention is shown in connection with the pipe sections 1 and 2, each of which is provided with the usual bell 3 at one end, the other end constituting the spigot, and provided with an external annular rib 4, whose external diameter is such that the said spigot end may slip loosely into the bell of a preceding section, to abut against the annular ledge or shoulder 5 at the inner end of the bell.

Internally and near the outer end, the bell is provided with an annular groove 6, which as clearly shown in the drawing is spaced outwardly from the rib 4, and cooperates therewith to provide opposed abutments to hold the completed packing in place, and to prevent relative axial movement of the sections.

The improved packing includes a pair of cooperating rings 7 and 8 each of compressible material such as rubber, the ring 7 of which is adapted to encircle the spigot end of the pipe, on the inner side of the rib 4. The ring 7 is of a size to fit about the spigot end slightly on the stretch, and the ring 8 is of a size to fit within the bell, and to encircle the ring 7, Referring to the drawing it will be noticed that the rings 7 and 8 are wedge shaped, and that the cross sectional forms of the ring are symmetrical, the inclined faces of the rings being adjacent and in contact. The dimensions of the respective rings are such that the small end of the ring 8 will fit over the small end of the ring 7, when said ring 7 is in place on the spigot.

In placing the improved packing, the ring 7 is first placed upon the spigot end of a pipe section, and as previously stated the diameter of the ring is such that it will be slightly on the stretch when so placed. The ring 8 is then placed, the small end thereof lapping on the small end of ring 7, and the spigot end of the section 2 is then inserted in the bell of the section 1. After the placing of the sections, the ring 8 is pushed over the ring 7.

The cooperating wedge or inclined faces of the two rings because of the degree of the taper, as shown in the drawings, these constitute what may be termed, for the purposes of this disclosure, a "slow" locking taper. Thus when the rings are telescoped and compressed, this causes the outer face of the ring 8 to closely grip the inner face of the bell, and causes the inner face of the ring 7 to closely grip the spigot end of the section 2. There is sufficient friction between the rings due to the "slow" taper to cause them to hold tight when telescoped, and the rough surfaces of the spigot and bell respectively, to prevent displacement of the rings, and the ring 8 may be pushed as tightly into place between the ring 7, and the bell as may be necessary to make a tight seal. As shown, the inner ring 7 has a relatively wide surface at its small end for engagement by a calking tool.

In packings of this character, it is desirable that the seal or packing 7—8 of rubber be protected against the material passing through the pipe, and against the atmosphere. To attain the former end, a packing 9 of fibrous material, as for instance soap treated jute, known in the trade as Miller grip hemp may be used, and to attain the latter, lead indicated at 10 may be calked into the bell outside of the rings 7 and 8.

As clearly shown, the fibrous filling fills the space between the packing 7—8 and the rib 4, bearing against the said rib, to prevent relative longitudinal movement of the sections, and the lead 10 fills the groove 6, and cooperates with the other elements for the same purpose. The groove also holds the calked lead in place, and insures against axial displacement of any part of the packing.

After the rings have been placed, and tightened, they cannot move outward because of the lead filling, nor is any bodily displacement of the ring 7 possible. Both rings however may slightly change conformation in the direction of the jute filling, since this does not provide a rigid filler.

Where the width of the space between bell and spigot is less or greater than normal, the rings compensate by moving upon each other a less or greater distance, and in either case there is a close resilient packing between the pipe sections. The packing is gas proof, since the resilient rubber will conform to the adjacent surfaces of bell and spigot.

The outer ring 8 may be of slightly greater external diameter than the internal diameter of the bell, so that it will tend to grip the same, and the grip will be tightened by the expansion thereof as it moves on the inner ring. While lead is shown as the packing to insure the packing against outward displacement, and to protect it against the elements, it will be understood that any other suitable material may be used, as for instance cement.

I claim:

1. A packing for pipe sections of the bell and spigot type, including in combination with the pipes, a pair of closed rings of readily deformable material adapted to conform to the inequalities in the surface of the pipes, one of a size to encircle the spigot slightly on the stretch, the other of a size to fit closely within the bell and to encircle the first named ring, the contacting faces of the rings being steeply inclined thereby to tightly engage the rings about the spigot and within the bell respectively when they are moved axially.

2. A joint for pipes of the bell and spigot type, including a pair of endless rings of deformable rubber, each having one relatively thin end, one being adapted and of a size to closely encircle the spigot end of one pipe, and the other having an external diameter approximately that of the internal diameter of the bell, said rings telescoping and having adjacent cooperating 'slow' tapering surfaces similarly inclined, so that axial movement of the rings with respect to each other will cause them to be compressed radially in opposite directions, the taper of the cooperating surfaces contacting and being such that when the rings are moved axially with respect to each other, the friction between the cooperating engaging surfaces will tend to hold them in adjusted position.

3. A joint for pipes of the bell and spigot type, including a pair of continuous rings of readily deformable material, each having one relatively thin end, one being adapted and of a size to closely encircle the spigot end of one pipe, and the other having an external diameter approximately that of the internal diameter of the bell, said rings telescoping and having adjacent cooperating 'slow' tapering surfaces similarly inclined, so that axial movement of the rings with respect to each other will cause each to be compressed radially in opposite directions, the taper of the co-operating surfaces contacting and being such that when the rings are moved axially with respect to each other, the friction between the cooperating engaging surfaces will tend to hold them in adjusted position, the first named ring having a relatively wide surface at the small end for engagement by a calking tool.

Signed at Birmingham, in the county of Jefferson and State of Alabama, this 9th day of January, A. D. 1926.

ARNOLD J. HERRMANN.